(12) United States Patent
Verma et al.

(10) Patent No.: US 9,003,351 B1
(45) Date of Patent: Apr. 7, 2015

(54) SYSTEM AND METHOD FOR REDUCING POWER CONSUMPTION OF INTEGRATED CIRCUIT

(71) Applicants: Chetan Verma, Noida (IN); Kushagra Khorwal, Ghaziabad (IN); Amit Roy, Noida (IN); Rounak Roy, Noida (IN); Vijay Tayal, Noida (IN)

(72) Inventors: Chetan Verma, Noida (IN); Kushagra Khorwal, Ghaziabad (IN); Amit Roy, Noida (IN); Rounak Roy, Noida (IN); Vijay Tayal, Noida (IN)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/150,731

(22) Filed: Jan. 8, 2014

(51) Int. Cl.
   *G06F 9/455* (2006.01)
   *G06F 17/50* (2006.01)
(52) U.S. Cl.
   CPC .................................. *G06F 17/5045* (2013.01)
(58) Field of Classification Search
   USPC ........................................................ 716/133
   See application file for complete search history.

(56) References Cited

U.S. PATENT DOCUMENTS

| | | | |
|---|---|---|---|
| 6,289,495 B1 | 9/2001 | Raspopovic | |
| 6,305,004 B1 | 10/2001 | Tellez | |
| 6,353,917 B1 * | 3/2002 | Muddu et al. | 716/113 |
| 6,397,170 B1 * | 5/2002 | Dean et al. | 703/14 |
| 7,036,101 B2 | 4/2006 | He | |
| 7,698,663 B2 | 4/2010 | Nakatake | |
| 8,255,857 B2 | 8/2012 | He | |
| 2006/0090153 A1 * | 4/2006 | Ho et al. | 716/11 |
| 2009/0164963 A1 * | 6/2009 | Zarkesh-Ha et al. | 716/12 |
| 2012/0290997 A1 * | 11/2012 | Wen et al. | 716/129 |

OTHER PUBLICATIONS

Paul Zuber, Robert Hartl, Thomas Ilnseher and Walter Stechele, "Wire Topology Optimization for Low Power (TopCool and TopCoolViewer)", http://www.cecs.uci.edu/~papers/date07_universitybooth/Sessions/Session8/S83.pdf, 2007.

* cited by examiner

*Primary Examiner* — Paul Dinh
*Assistant Examiner* — Bryce Aisaka
(74) *Attorney, Agent, or Firm* — Charles Bergere

(57) ABSTRACT

A method and system for reducing power consumption of an integrated circuit with an EDA tool by analyzing and modifying a layout design having a plurality of nets across multiple metal layers. The method includes identifying long nets in the layout design, determining an interconnect capacitance of each of the long nets, determining a net level switching activity of each of the long nets, generating a high power impact list using the interconnect capacitance and the switching activity of each of the long nets, modifying a metal spacing of the long nets listed in the high power impact list.

14 Claims, 4 Drawing Sheets

SYSTEM AND METHOD FOR REDUCING POWER CONSUMPTION OF INTEGRATED CIRCUIT

BACKGROUND OF THE INVENTION

The present invention relates generally to integrated circuits, and, more particularly, to a system for reducing power consumption of integrated circuits.

Integrated circuits are designed using digital logic elements including logic gates and combinational logic circuits. The digital logic elements include complementary metal-oxide semiconductor (CMOS) circuits. CMOS circuits consume power, which leads to high power dissipation and increases junction temperatures of the integrated circuits. Power dissipation is also a concern, especially for low power circuits that run on batteries because excessive power consumption reduces battery charge more quickly.

FIG. 1 shows a chart illustrating power dissipation in an integrated circuit (IC) for a sample design in a particular process technology node. This is shown for illustrating a trend of power break-up within a design As can be seen, dynamic power accounts for nearly 60% of the power consumed and leakage accounts for the remaining 40% in deep sub micron technology nodes. Within the dynamic power consumption, there is short circuit power and switching power. Switching power is dissipated by CMOS circuits by charging and discharging various load capacitances (gate/wire/source/drain capacitances) of the transistors. Switching power can be broken down into gate capacitance power and interconnect power, with interconnect power being further broken down into data interconnect power and clock interconnect power, where FIG. 1 shows that data interconnect power accounts for nearly 21.6% of power consumption and clock interconnects only 2.4%. Therefore, it would make sense to try to reduce this data power consumption.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, an electronic design automation (EDA) tool for reducing power consumption of a layout design of an integrated circuit is provided. The layout design includes a plurality of nets across multiple metal layers. The EDA tool includes a memory used to store the layout design of the integrated circuit and a processor in communication with the memory. The processor includes a long net identifier for identifying long nets in the layout design, an interconnect capacitance determining unit for determining an interconnect capacitance of each of the long nets, a net level switching activity determining unit for determining a net level switching activity of each of the long nets, a high power impact list generator for generating a high power impact list using the interconnect capacitance and the net level switching activity of each of the long nets, and a metal spacing modifier for modifying a metal spacing of the long nets listed in the high power impact list from adjacent nets and a pre-router unit for pre-routing the long nets listed in the high power impact list prior to routing any other nets in the layout design.

In another embodiment, the present invention provides a method for reducing power consumption of an integrated circuit with an EDA tool by analyzing and modifying a layout design of the integrated circuit, wherein the layout design includes a plurality of nets across multiple metal layers. The method includes the EDA tool performing the following steps: identifying long nets in the layout design, determining an interconnect capacitance of each of the long nets, determining a net level switching activity of each of the long nets, generating a high power impact list using the interconnect capacitance and the switching activity of each of the long nets, modifying a metal spacing of the long nets listed in the high power impact list from adjacent nets.

Figure 1:
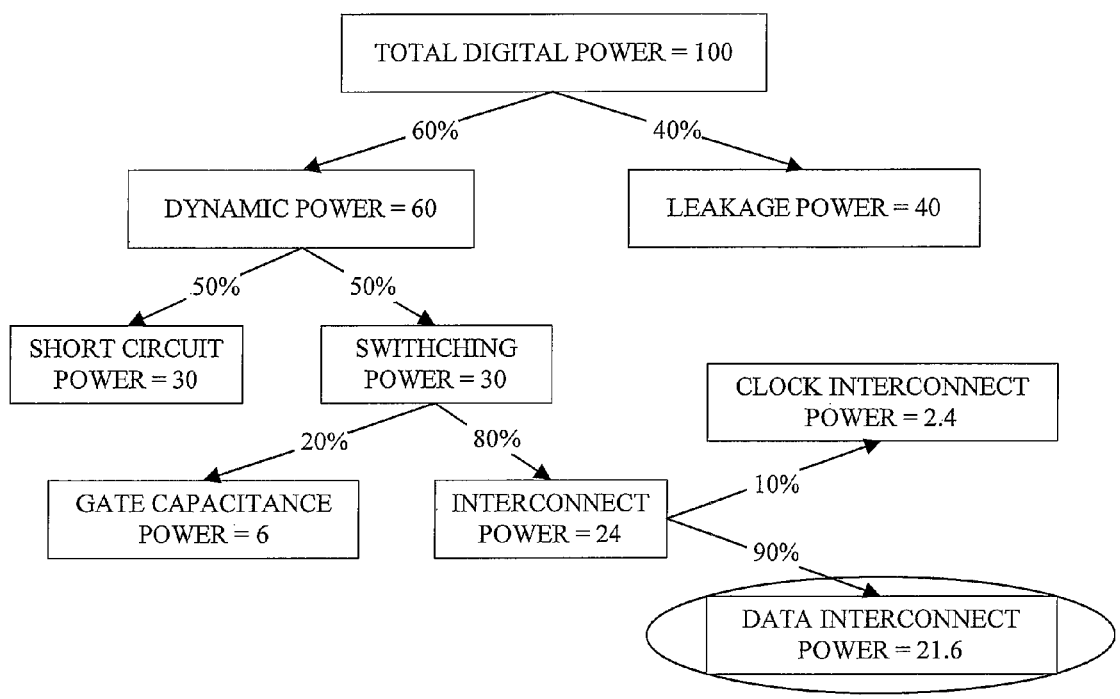
FIG. 1 is a diagram illustrating various forms and percentages of power consumption in an integrated circuit for a sample design in a particular process technology node.
Figure 2:
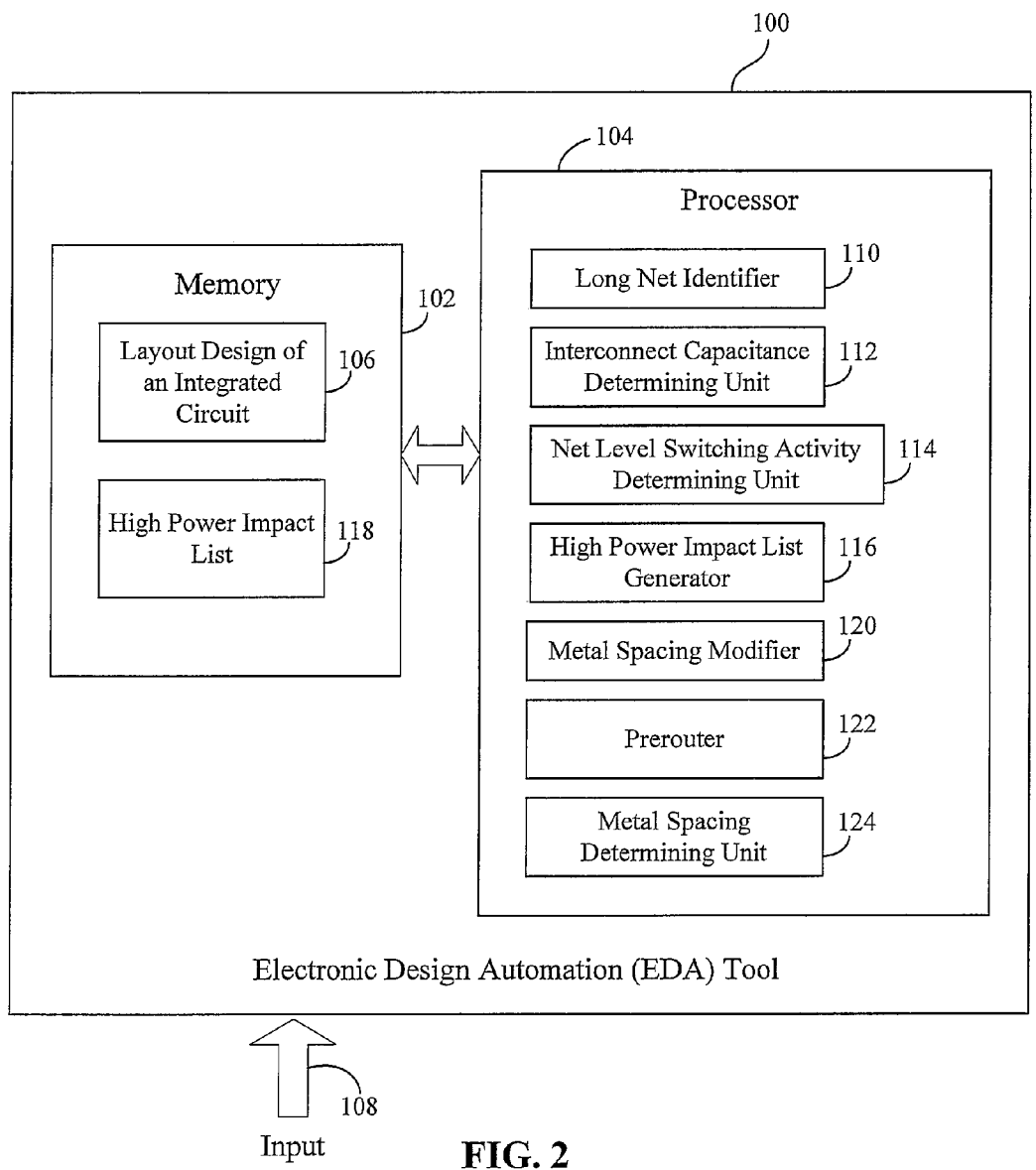
FIG. 2 is a schematic block diagram of an electronic design automation (EDA) tool for reducing power consumption of an integrated circuit design in accordance with an embodiment of the present invention.

Referring now to FIG. 2, a schematic block diagram illustrating an electronic design automation (EDA) tool 100 for reducing power consumption of a layout design 106 of an integrated circuit in accordance with an embodiment of the present invention is shown. The EDA tool 100 includes a memory 102 and a processor 104 in communication with the memory 102. The memory 102 stores the layout design 106 of the integrated circuit. The memory 102 and processor 104 comprise a computer system that can range from a stand-alone personal computer to a network of processors and memories, to a mainframe system. The memory can be a RAM, ROM or flash memory. Examples of the EDA tool 100 include Cadence® Encounter™ digital IC design platform, Integrated Circuit Compiler (ICC) by Synopsys, Inc., and Olympus SoC by Mentor Graphics, Inc. Such tools and computer systems are known to those of skill in the art. Examples of the electronic circuit design 106 include microprocessor, microcontroller unit (MCU), system-on-chip (SoC), and application specific integrated circuit (ASIC) designs. The layout design 106 includes a plurality of nets (not shown) across multiple metal layers, the plurality of nets are signal data nets in the layout design. In a preferred embodiment, the layout design 106 is received through an input 108 of the EDA tool 100.

The processor 104 includes a long net identifier 110 and an interconnect capacitance determining unit 112.

The long net identifier 110 reads the layout design 106 from the memory 102 and identifies long nets in the layout design 106. In a preferred embodiment, the long nets are the nets that have a length larger than a predefined length threshold. In another preferred embodiment, the long nets are the nets that have an interconnect capacitance C higher than a predefined interconnect capacitance threshold. The interconnect capacitance C of each of the long nets are determined by the interconnect capacitance determining unit 112. If the long nets are identified based on the predefined length threshold, the interconnect capacitance determining unit 112 further determines the interconnect capacitance C of each of the long nets. The predefined length threshold or the predefined interconnect capacitance threshold is given by a user through the input 108.

The processor 104 also includes a net level switching activity determining unit 114 for determining a net level switching activity α of each of the long nets, a high power impact list generator 116 for generating a high power impact list 118 using the interconnect capacitance C and the net level switching activity α of each of the long nets, and a metal spacing modifier 120 for modifying a metal spacing of the long nets listed in the high power impact list 118 from adjacent nets.

It is known in the art that the power consumption P of each of the long nets is estimated by: $P=\alpha CV^2$, wherein, V is a supplied voltage of each of the long nets. Therefore, in a preferred embodiment, the high power impact list generator 116 calculates a product of the interconnect capacitance and the switching activity of each of the long nets. The high power impact list 120 is stored in the memory 102. In a preferred embodiment, the high power impact list 118 lists the long nets in a descending order of the product, so that the metal spacing of the long nets listed in the high power impact list 118 from adjacent nets are modified by the metal spacing modifier 120 in the descending order of the product. Therefore, a long net in the high power impact list 118 with a highest product of the interconnect capacitance and the switching activity leading to maximum interconnect power dissipation is handled by the metal spacing modifier 120 at priority. In a preferred embodiment, the metal spacing modifier 120 increases the metal spacing of the long nets from adjacent nets. In another preferred embodiment, the processor 104 further includes a pre-router 122 for pre-routing the long nets listed in the high power impact list prior to routing any other nets in the layout design, the number of the long nets in the high power impact list 118 to be modified is based on routability of the layout design.

In an embodiment of the present invention, the processor 104 further includes a metal spacing determining unit 124 for determining a preferred metal spacing of each of the metal layers for a given process node of the layout design.

Figure 3:
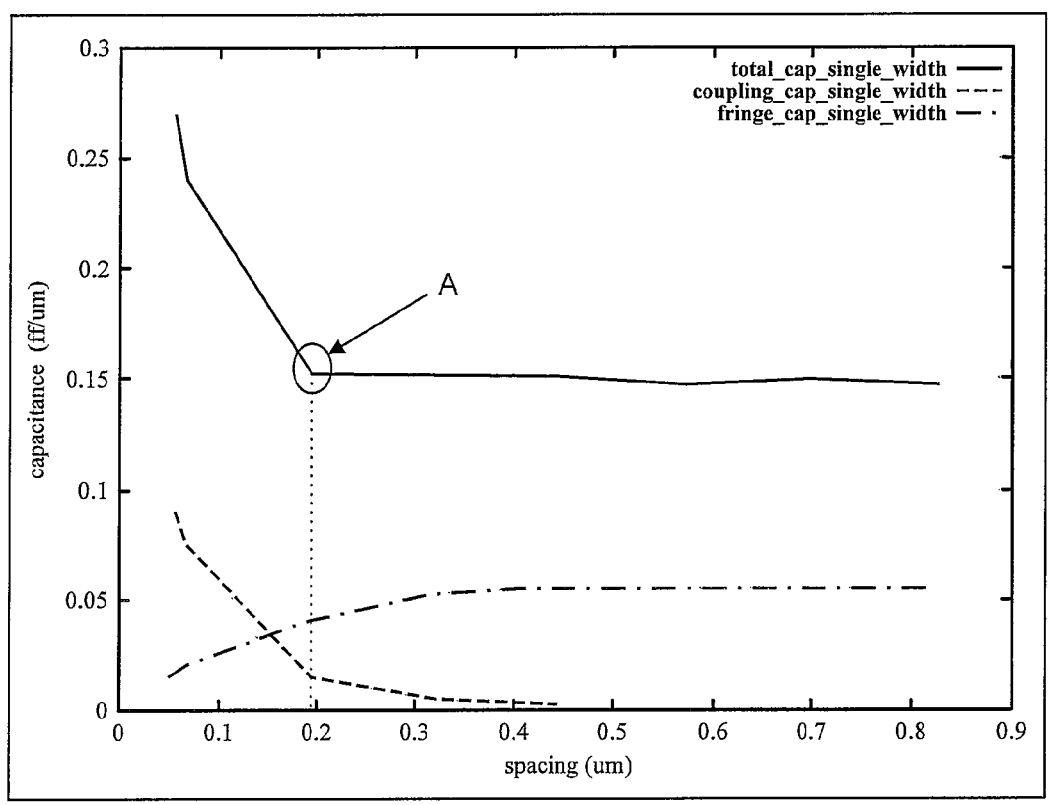
FIG. 3 is a graph depicting a relationship between a metal spacing and total interconnect capacitance for one metal layer in 40 nm process node in accordance with an embodiment of the present invention.

Referring to FIG. 3, a graph depicting a relationship between a metal spacing and total interconnect capacitance for one metal layer in 40 nm process node in accordance with an embodiment of the present invention is shown. The total interconnect capacitance includes a sum of coupling capacitance and fringe capacitance. As shown in FIG. 3, with the metal spacing getting larger, the coupling capacitance increases and the fringe capacitance decreases, and at point A, the total interconnect capacitance reaches a minimum value. The metal spacing determining unit 124 finds the point A and determines the corresponding metal spacing of the point A is the preferred metal spacing of this metal layer in 40 nm process node. Therefore, the metal spacing modifier 120 modifies the metal spacing of the long nets from adjacent nets as the preferred metal spacing. The process is repeated for all the metal layers of the layout design 106.

Figure 4:
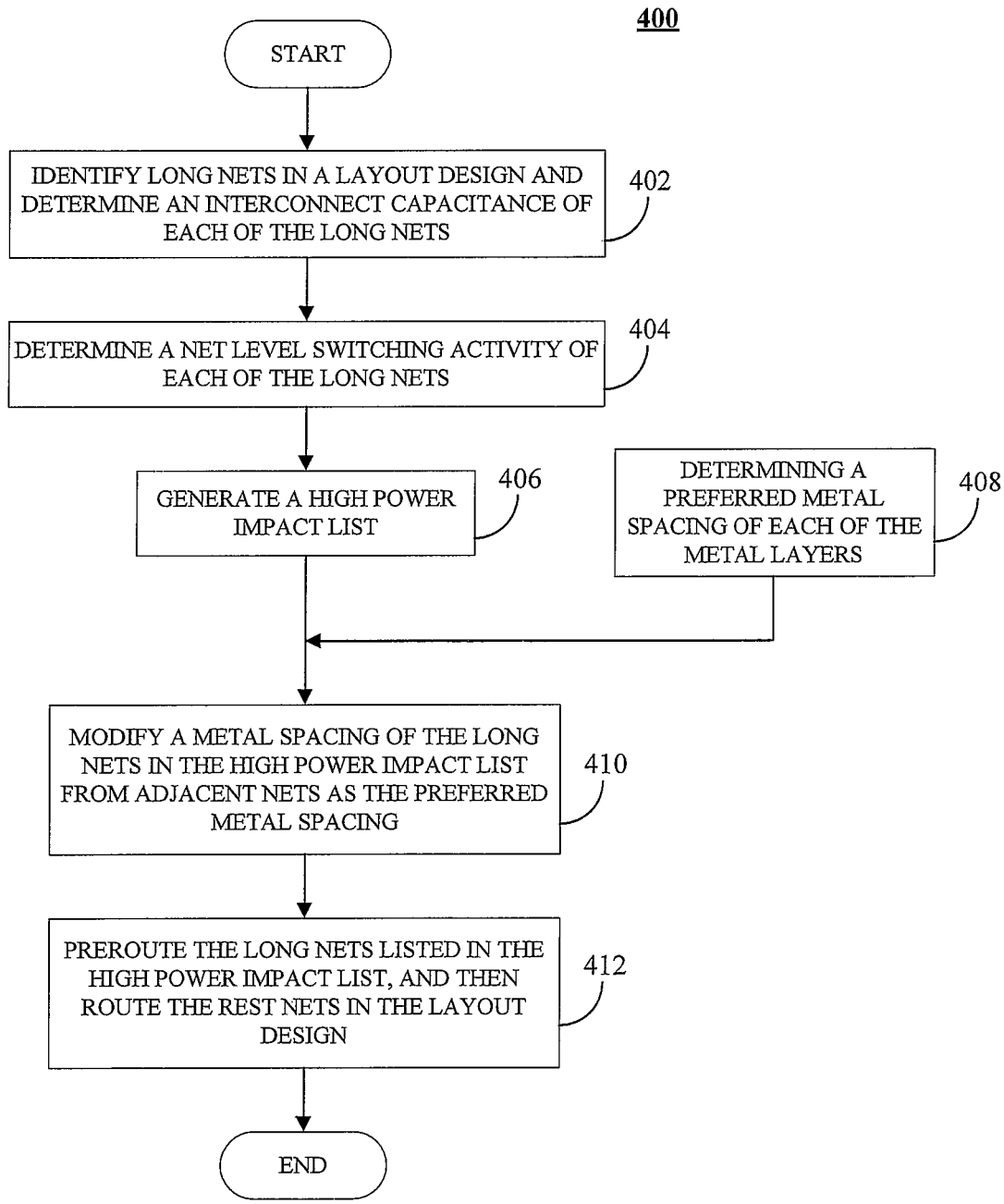
FIG. 4 is a flowchart of a method for reducing power consumption of a layout design of an integrated circuit in accordance with an embodiment of the present invention.

Referring now to FIG. 4, a flowchart depicting a method 400 for reducing power consumption of a layout design of an integrated circuit in accordance with an embodiment of the present invention is shown. Steps in the flowchart of FIG. 4 have been explained in conjunction with FIG. 2.

The layout design 106 stored in the memory 102 is given by a user through the input 108. The layout design 106 includes a plurality of nets (not shown) across multiple metal layers, the plurality of nets are signal data nets in the layout design. The processor 104 identifies a predefined length threshold or a predefined interconnect capacitance threshold for identifying long nets in the layout design 106.

Starting at step 402, the long net identifier 110 of the processor 104 reads the layout design 106 from the memory 102 and identifies long nets in the layout design 106 based on the predefined length threshold or the predefined interconnect capacitance threshold. In a preferred embodiment, the long nets are the nets that have a length larger than the predefined length threshold. In another preferred embodiment, the long nets are the nets that have an interconnect capacitance C higher than the predefined interconnect capacitance threshold. The interconnect capacitance C of each of the long nets are determined by the interconnect capacitance determining unit 112. If the long nets are identified based on the predefined length threshold, the interconnect capacitance determining unit 112 further determines the interconnect capacitance C of each of the long nets. At step 404, the net level switching activity determining unit 114 of the processor 104 determines a net level switching activity α of each of the long nets.

At step 406, the high power impact list generator 116 of the processor 104 generates a high power impact list 118 using the interconnect capacitance C and the net level switching activity α of each of the long nets. It is known in the art that the power consumption P of each of the long nets is estimated by: $P=\alpha CV^2$, wherein, V is a supplied voltage of each of the long nets. Therefore, in a preferred embodiment, the high power impact list generator 116 calculates a product of the interconnect capacitance and the switching activity of each of the long nets. The high power impact list 120 is stored in the memory 102.

In a preferred embodiment, at step 408 the metal spacing determining unit 124 determines a preferred metal spacing of each of the metal layers for a given process node of the layout design. As shown in FIG. 3, the total interconnect capacitance includes a sum of coupling capacitance and fringe capacitance. With the metal spacing getting larger, the coupling capacitance increases and the fringe capacitance decreases, and at point A, the total interconnect capacitance reaches a minimum value. The metal spacing determining unit 122 finds the point A and determines the corresponding metal spacing of the point A is the preferred metal spacing of this metal layer in 40 nm process node.

At step 410, the metal spacing modifier 120 modifies the metal spacing of the long nets listed in the high power impact list 118 from adjacent nets. In a preferred embodiment, the high power impact list 118 lists the long nets in a descending order of the product, so that the metal spacing of the long nets listed in the high power impact list 118 from adjacent nets are modified by the metal spacing modifier 120 in the descending order of the product. Therefore, a long net in the high power impact list 118 with a highest product of the interconnect capacitance and the switching activity leading to maximum interconnect power dissipation is handled by the net width modifier 120 at priority. In a preferred embodiment, the metal spacing modifier 120 increases the metal spacing of the long nets listed in the high power impact list from adjacent nets. In another embodiment of the presentation, the metal spacing modifier 120 modifies the metal spacing of the long nets from adjacent nets as the preferred metal spacing.

At step 412, the pre-router 122 pre-routes the long nets listed in the high power impact list 118, and then routes the rest nets in the layout design 106. In another preferred embodiment, the number of the long nets listed in the high power impact list 118 to be modified is based on the routability of the layout design.

The process is repeated for all the long nets listed in the high power impact list 116 of the layout design 106 to reduce the overall power consumption.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. An electronic design automation (EDA) tool for reducing power consumption of a layout design of an integrated circuit, wherein the layout design includes a plurality of nets across multiple metal layers, the EDA tool comprising:
   a memory used to store the layout design of the integrated circuit; and
   a processor, in communication with the memory, wherein the processor includes:
      a long net identifier for identifying long nets in the layout design;
      an interconnect capacitance determining unit for determining an interconnect capacitance of each of the long nets;
      a net level switching activity determining unit for determining a net level switching activity of each of the long nets;
      a high power impact list generator for generating a high power impact list using the interconnect capacitance and the net level switching activity of each of the long nets, wherein the high power impact list generator calculates a product of the interconnect capacitance and the switching activity of each of the long nets, and wherein the high power impact list lists the long nets in a descending order of the product such that the long nets are modified in the descending order of the product;
      a pre-router for pre-routing the long nets listed in the high power impact list prior to routing any other nets in the layout design, and wherein the number of the long nets to be modified is based on routability of the layout design; and
      a metal spacing modifier for modifying a metal spacing of the long nets listed in the high power impact list from adjacent nets.

2. The EDA tool of claim 1, wherein the long nets are the nets that have a length larger than a predefined length threshold.

3. The EDA tool of claim 1, wherein the long nets are the nets that have the interconnect capacitance higher than a predefined interconnect capacitance threshold.

4. The EDA tool of claim 1, wherein the metal spacing modifier increases the metal spacing of the long nets listed in the high power impact list from adjacent nets.

5. The EDA tool of claim 1, wherein the processor further includes a metal spacing determining unit for determining a preferred metal spacing of each of the metal layers for a given process node of the layout design.

6. The EDA tool of claim 5, wherein at the preferred metal spacing, a total interconnect capacitance of the metal layer is not higher than that at other metal spacing.

7. The EDA tool of claim 5, wherein the metal spacing modifier modifies the metal spacing of the long nets from adjacent nets as the preferred metal spacing.

8. A method for reducing power consumption of an integrated circuit with an Electronic Design Automation (EDA) tool by analyzing and modifying a layout design of the integrated circuit, wherein the layout design includes a plurality of nets across multiple metal layers, wherein the EDA tool includes a memory for storing the layout design and a processor coupled to the memory, wherein the method comprises the processor performing the following steps:
   identifying long nets in the layout design;
   determining an interconnect capacitance of each of the long nets;
   determining a net level switching activity of each of the long nets;
   generating a high power impact list using the interconnect capacitance and the switching activity of each of the long nets, wherein generating the high power impact list includes calculating a product of the interconnect capacitance and the switching activity of each of the long nets, and wherein generating the high power impact list includes listing the long nets in a descending order of the product, such that the long nets in the high power impact list are modified in the descending order of the product;
   pre-routing the long nets listed in the high power impact list prior to routing any other nets in the layout design, and wherein the number of the long nets to be modified is based on routability of the layout design;
   modifying a metal spacing of the long nets listed in the high power impact list from adjacent nets; and
   generating and storing an updated layout design that includes the modified metal spacing of the long nets listed in the high power impact list in the memory.

9. The method of claim 8, wherein the nets that have a length greater than a predefined length threshold are identified as the long nets.

10. The method of claim 8, wherein the nets that have the interconnect capacitance greater than a predefined interconnect capacitance threshold are identified as the long nets.

11. The method of claim 8, wherein modifying the metal spacing of the long nets from adjacent nets includes increasing the metal spacing.

12. The method of claim 8, further comprising determining a preferred metal spacing of each of the metal layers for a given process node of the layout design.

13. The method of claim 12, wherein at the preferred metal spacing, a total interconnect capacitance of the metal layer is not higher than that at other metal spacing.

14. The method of claim 12, wherein the metal spacing of the long nets from adjacent nets are modified as the preferred metal spacing.

* * * * *